(12) United States Patent
Elsey

(10) Patent No.: US 8,758,663 B2
(45) Date of Patent: Jun. 24, 2014

(54) DEVICE FOR MAKING OBJECTS BY APPLYING MATERIAL OVER A SURFACE

(75) Inventor: Justin Elsey, St Peters (AU)

(73) Assignee: Zydex Pty Ltd, St. Peters (AU)

( * ) Notice: Subject to any disclaimer, the term of this patent is extended or adjusted under 35 U.S.C. 154(b) by 0 days.

(21) Appl. No.: 13/981,855

(22) PCT Filed: Jan. 26, 2012

(86) PCT No.: PCT/AU2012/000062
§ 371 (c)(1),
(2), (4) Date: Jul. 25, 2013

(87) PCT Pub. No.: WO2012/100297
PCT Pub. Date: Aug. 2, 2012

(65) Prior Publication Data
US 2013/0307194 A1   Nov. 21, 2013

(30) Foreign Application Priority Data

Jan. 26, 2011 (AU) ................. 2011900240
Jan. 27, 2011 (AU) ................. 2011900248
Jan. 27, 2011 (AU) ................. 2011900249
Jan. 28, 2011 (AU) ................. 2011900288

(51) Int. Cl.
*B29C 41/22* (2006.01)

(52) U.S. Cl.
USPC ........ 264/308; 425/174.4; 425/169; 425/375; 264/113; 264/294; 264/241; 700/119; 118/323

(58) Field of Classification Search
USPC .......... 264/401, 113, 308, 241, 294; 425/174.4, 169, 375; 700/119; 118/323
See application file for complete search history.

(56) References Cited

U.S. PATENT DOCUMENTS 5,149,548 A * 9/1992 Yamane et al. ............ 425/174.4
2011/0101569 A1* 5/2011 Yasukochi ................... 264/401

FOREIGN PATENT DOCUMENTS

| DE | 202005012524 U1 | 10/2005 |
| EP | 2150077 A1 | 2/2010 |
| WO | 96/12610 A2 | 5/1996 |
| WO | 97/11835 A2 | 4/1997 |
| WO | 97/11836 A1 | 4/1997 |
| WO | 2011/011818 A1 | 2/2011 |

* cited by examiner

*Primary Examiner* — Joseph S Del Sole
*Assistant Examiner* — Lawrence D Hohenbrink, Jr.
(74) *Attorney, Agent, or Firm* — Eric L. Lane

(57) ABSTRACT

A device for making an object comprises a substantially flat surface, an applicator, and a controller. The applicator is operable to project at an elevation angle without a substantial downward component a material used to make the object towards the substantially vertical flat surface. The controller is adapted to receive instructions for making the object and is configured to coordinate relative movement of the applicator and the surface and the application of the material by the applicator such that the material applied over at least one portion of the surface as a plurality of individually determined layers. In use the object is made adjacent to the surface.

20 Claims, 7 Drawing Sheets

DEVICE FOR MAKING OBJECTS BY APPLYING MATERIAL OVER A SURFACE

FIELD OF THE INVENTION

The present invention generally relates to a device for building objects by layer-wise deposition of a material.

BACKGROUND OF THE INVENTION

A three dimensional—that is solid—object has been built up by depositing a material from an applicator over a flat and horizontal fabrication platform one layer at a time. The platform was below the applicator. Once a layer was deposited and hardened, then another layer was deposited and hardened in contact with the previous layer. Repetition of this process allowed multi-laminate solid objects to be fabricated. This is the basis of techniques such as rapid prototyping.

Material leaks from applicators occur all too frequently. This results in a malformed solid object which may be useless. It may also result in material leaking onto the bearings on which the platform moves, thereby interfering with the operation of the system. Prior art apparatus have tried to solve this problem by active pressure control of the liquid material and storing of the material a distance from the deposition device. This approach is, however, typically not very effective and makes the apparatus overly complex.

SUMMARY OF THE INVENTION

According to a first aspect of the invention, there is provided, a device for making an object comprising:

an applicator that projects at an elevation angle without a substantial downward component a material used to make the object towards a surface.

In the context of this specification, "an object" is tangible. The object may, for example, have a void or hollow in it, such as has a vase. The object may be rigid, but may alternatively or additionally comprise a resilient material, such as an elastomer, for example. Generally, the object may be described as a solid object.

In an embodiment, the device comprises the surface, and the object is made adjacent to the surface.

In an embodiment, the surface is flat.

In an embodiment, the surface is substantially vertical, that is, the surface has a similar relationship to the vertical as a wall has. In other embodiments however, the surface is tilted with respect to the vertical.

In an embodiment, the elevation angle is between negative ten degrees (−10°) and positive ninety degrees (+90°).

The elevation angle is a vertical angle above the horizon. In the context of this specification, elevation angle refers to the vertical angle measured from the horizon (0°) towards the zenith (+90°) or alternatively down to the nadir (−90°). An elevation angle of negative ten degrees is inclined gently downwards. Projecting with an elevation angle of +90° is shooting straight up.

Projecting the material in a direction with no substantial downward component may result in any material (or other substance) that has leaked from the applicator falling free of the surface and object being made. Leaking material (or substance) occurs all too frequently, and may ruin the object or at least result in a malformed object.

In an embodiment, the direction is substantially horizontal. The elevation angle may be between −3° and +3°. The elevation angle may be between −1° and +1°. Nominally horizontally projecting applicators may be used. These applicators have desirable characteristics.

In an embodiment, the direction is predominantly upwards. The elevation angle may be between 80° and 90°.

In an embodiment, the applicator is not coupled to a translation unit for substantially vertical movement of the applicator. This reduces the chance of leakage from the applicator which may occur during its movement in the substantially vertical direction due to acceleration forces.

In an embodiment, the applicator is coupled to a first translation unit for movement in a first direction. The first direction may be substantially horizontal.

In an embodiment, the device is configured to translate the surface in the plane of the surface.

In an embodiment, the surface may be coupled to at least one translation unit for movement in second and third directions. The second and third directions may be orthogonal to the first direction. The second and third direction may be orthogonal to each other. One of the second and third directions may be vertical and the other may be horizontal.

In an embodiment, the device comprises a controller adapted to receive instructions for making the object and is configured to coordinate relative movement of the applicator and surface, and the application of the material by the applicator. The relative movement may be coordinated such that the material is applied over at least one portion of the surface as a plurality of individually determined layers. Each individually determined layer may differ from another of the layers by, for example, the shape of their respective boundaries. Not every layer needs to be different, however. The controller may comprise a processor.

In an embodiment, the applicator and the surface are separated relative to each other by one or more steps, each step being equal to a predetermined length. The length may be, or may be commensurate with, the thickness of a layer of deposited material. Typically, the applicator may be set to a first predetermined position, the material is deposited, and then the applicator is set to a second predetermined position in preparation for the further deposition of the material.

In an embodiment, the device is further adapted to apply a substance adapted to support the material. The applicator may be adapted to apply the substance adapted to support the material. Alternatively, the device may comprise another applicator adapted to apply the substance. The substance may be applied over the at least one or another portion of the surface.

The material may be applied over a portion of the applied supporting substance. Thus, more complex objects having features that could not otherwise be produced (such as an overhang of material supported on its side by the substance) can be produced. The substance and the material may be separated by taking advantage of their different properties. The different properties may be, for example, different solubility in a solute, different melting point etc.

In an embodiment, the device comprises a shaper arranged to shape the applied material. A shaper, for example a levelling device, may be employed to ensure that the thickness of an applied layer of material is constrained to a prescribed thickness.

In an embodiment, the applicator is adapted to apply a particular material. The material may comprise a photo-curable fluid. The material may comprise a phase change material. The material may be a combination of the photo-curable fluid and the phase change material.

In an embodiment the applicator is capable of projecting a single drop of material when instructed to do so.

In an embodiment, the surface is compatible with the material. Alternatively or additionally, the surface may be compatible with the substance.

In an embodiment, the device comprises a light source illuminating at least some of the surface, the light having characteristics suitable for the curing of a photo-curable fluid. The light source may emit ultra-violet light.

In an embodiment, the applicator is configured to project the material substantially horizontally. The applicator may have two material reservoirs and a passageway for the communication of material from one of the reservoirs to the other. One of the reservoirs may have an associated nozzle from which material can be projected, and the applicator may be configured so that the height of the material in the other reservoir is lower than the nozzle. The applicator may have a control loop to control the material level in the other reservoir such that it is lower than the nozzle. The applicator may have a sensor for sensing the material level in the other reservoir. The reservoirs may be configured such that a negative head of pressure is maintained in the reservoir having the associated nozzle.

According to a second aspect of the invention, there is provided a method of making an object, the method comprising the step of:

projecting at an elevation angle without a substantial downward component a material towards a surface adjacent to which the object is made.

In an embodiment, the elevation angle is between negative ten degrees (−10°) and positive ninety degrees (+90°).

In an embodiment, the direction is substantially horizontal. The elevation angle may be between −3° and +3°. The elevation angle may be between −1° and +1°.

In an embodiment, the direction is predominantly upwards. The elevation angle may be between 80° and 90°.

In an embodiment, the method comprises the step of receiving instructions to coordinate relative movement of the applicator and surface, and the application of the material. The instructions may coordinate the relative movement such that the material is applied over at least one portion of the surface as a plurality of individually determined layers.

According to a third aspect of the invention there is provided a method of making an object, the method comprising the steps of:

receiving information indicative of the object; and controlling a device according to the first aspect of the invention using the information so received to make the device.

In an embodiment, the method comprises the step of generating the information. The information may be generated using a CAD program, for example.

In an embodiment, the method comprises the step of sending the information.

In an embodiment, the method comprises the step of delivering the object to a postal address.

In this aspect, the device of the first aspect may be used as part of a service in which orders for objects are received and the objects fabricated according to the received information. The objects can then be delivered to a supplied postal address.

DESCRIPTION OF THE FIGURES

Embodiments of the invention will now be described, by way of example only, with reference with the accompanying figures.

DETAILED DESCRIPTION OF EMBODIMENTS OF THE INVENTION

Figure 1:
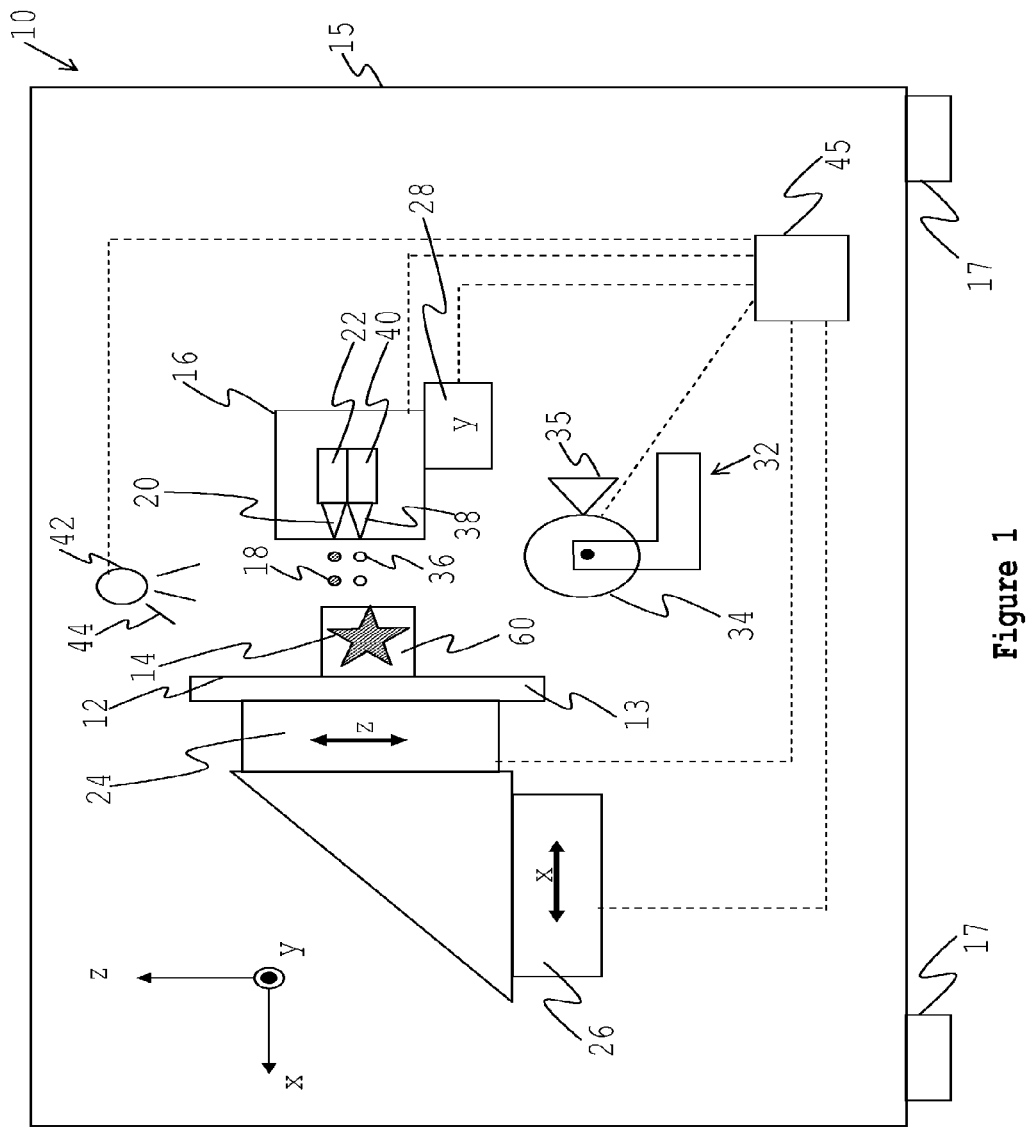
FIG. 1 is a schematic figure of one embodiment of a device for making an object.
Figure 2:
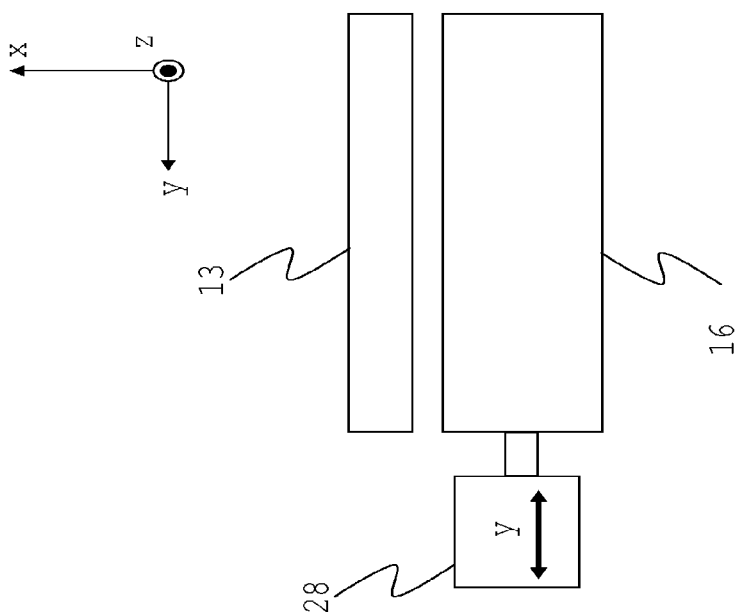
FIG. 2 shows a schematic diagram, from a different view, of the device of FIG. 1.

FIG. 1 is a schematic view of one embodiment of a device for making an object, the device generally being indicated by the numeral 10. FIG. 2 shows another schematic diagram, from a different view, of elements of the device of FIG. 1.

The device may have, for example, a chassis 15 with attached feet 17, or mounting points, for supporting the device above a bench top, other surface or structure, for example. The relative positioning and orientation of the feet (or mounting points), chassis and components define the orientation of the device, and thus the components, in use.

The device comprises a vertical surface 12 of a platform 13 adjacent to which the object 14 is made by layer wise deposition of a material 18. The surface 12 is flat, but some other embodiments have a curved surface. The device 10 has an applicator 16 that projects (or shoots or fires or ejects, "shoot" and "fire" and "eject" having the same meaning as project in this document) the material 18 used to make the object 14 from at least one nozzle 20 towards the surface 12. In this case, the material 18 is shot out of the nozzle at an elevation angle of around zero degrees (0°), that is, substantially horizontally. Unlike typical prior art devices, any material that leaks from the nozzle 20 of the device 10 falls downwards free of the object 14 being made and the surface 12. The risk that the final object may be misshaped by leaking material may be ameliorated or prevented entirely.

Figure 7:
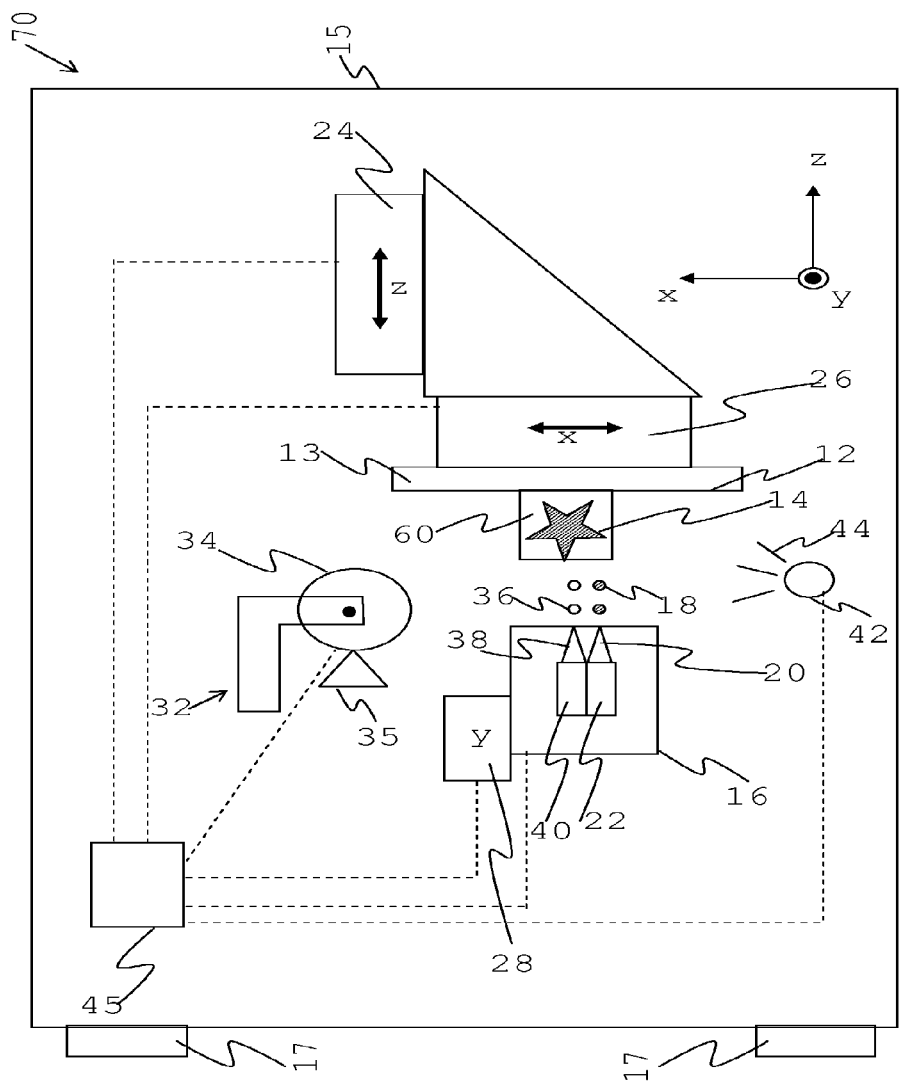
FIG. 7 is a schematic figure of another embodiment of a device for making an object.

Generally, any elevation angle without a substantial downward component suffices. In some circumstances, an elevation angle between negative ten degrees (−10°) and positive ninety degrees (+90°) is suitable, however in some embodiments the elevation angle may not fall within this range. Orientating the applicator such that material is shot straight up, as shown in FIG. 7, may minimise the risk of leaked material reaching the object 14 being made. In this case, however, the material may accumulate at the nozzle degrading performance. An angle less then 90°—say between 80° and 90°—may be preferable in some circumstances. Orientating the applicator such that the material is shot approximately horizontally may allow the design and use of applicators that operate in this orientation. Nominally horizontal projecting (shooting) applicators have desirable characteristics, as described below.

In the embodiment of FIG. 1 the applicator is capable of projecting a single drop of material when instructed to do so.

The surface may not necessarily be vertical. In some embodiments it may be orientated between 45° (forty five degrees) either side of vertical, and in some other embodiments by some other value not in this range.

Figure 5:
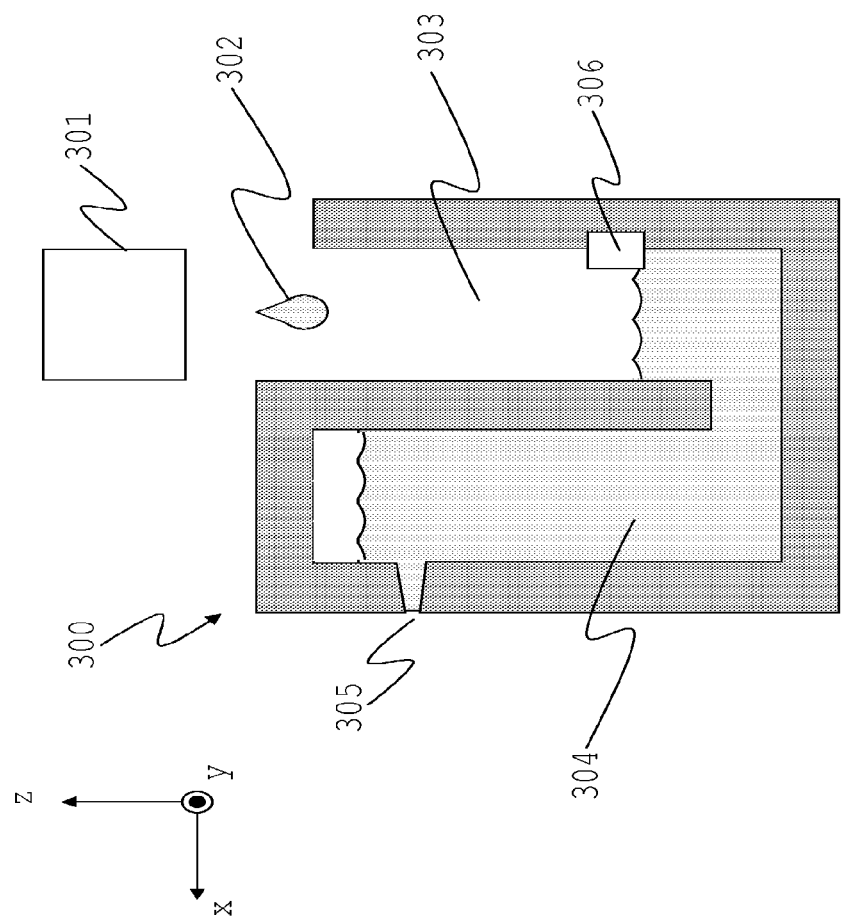
FIG. 5 shows an embodiment of a horizontal projecting (shooting) applicator configuration that may be incorporated in the device of FIG. 1.

The material 18 may be stored in a liquid phase in a material reservoir in communication with the applicator. In this, but not necessarily all, embodiments the reservoir 22 is integral with the applicator 16. In other embodiments, the reservoir is separate from the applicator and may be connected by a conduit such as a hose in which the material flows. Such hoses may be prone to snagging and/or failure, however. In yet a further embodiment, as shown in FIG. 5, the material may be drip fed into the applicator through an open feed port.

The applicator 16 and the surface 12 are displaceable relative to each other in the x-direction (a horizontal direction) between predetermined positions. That is, their separation may be altered. The predetermined positions may be separated by a distance commensurate with the thickness of a layer of deposited material. Typically, the applicator is set to a first predetermined distance from the surface, the material is applied, and then the surface is set to a second predetermined distance from the surface in preparation for the further application of the material. At each predetermined position a layer of material is applied. Each layer is determined independently, and thus may be different from another layer, so that an object of arbitrary shape may be fabricated. There are 100 to 1,000,000 predetermined applicator positions in a typical device, but the number may fall outside of this range. The minimum separation between predetermined positions may be determined by the characteristics of the motor causing the displacement. In the case of a stepping motor, for example, the separation between adjacent positions may be a multiple of the minimum step size that the motor is capable of. The separation may be set by software, or a combination of software and hardware factors. The separation of the first and second predetermined positions is typically equal to the thickness of a layer of the deposited material. The layer thickness may be in the range of 1 micron to 1 mm for example, but is typically around 0.01 to 0.1 mm for an object of the order of 10 cm. The thickness may be outside of this range.

The platform 13 is mechanically coupled to a translation unit 24 which can translate the platform and surface in the z-direction (vertical, as defined by gravity), and also to another translation unit 26 which can translate the platform horizontally in the x-direction perpendicular to the y-direction. Another translation unit 28 allows translation of the applicator in the y-direction. Other translation configurations are possible in other embodiments.

Figure 3:
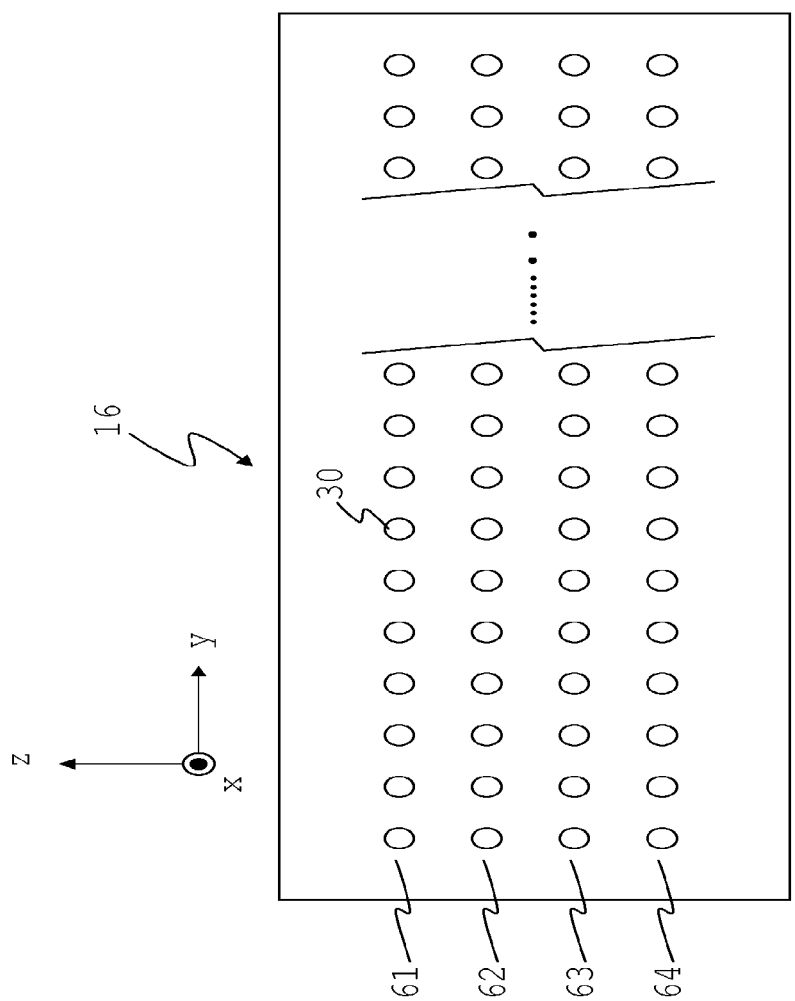
FIG. 3 shows a schematic drawing of an applicator of the device of FIG. 1.

FIG. 3 shows a schematic drawing of the applicator 16 of the device 10 of FIG. 1. This applicator, but not necessarily all suitable applicators, has multiple nozzles such as 30 each incorporating an individually addressable piezoelectric transducer capable of projecting, shooting or firing fluid from the nozzle. The nozzles may extend in one or both of the y- and z-directions. In the embodiment show in FIG. 3, the applicator has four fluid channels delivering material to the nozzles in rows 61, 62, 63, 64 respectively. Thus up to four different fluids (different materials or substances) may be applied simultaneously. The surface 12 is scanned up and down in the z-direction in front of the applicator by translation stage 24, and the applicator is scanned backwards and forwards in the y-direction by translation stage 28. The translation in the y-direction may only need to span the pitch of the nozzle spacing in the y-direction, or if the spacing is sufficiently small, without being translated at all. In this manner every part of the surface 12 can be individually addressed by each of the materials ejected by the applicator at an arbitrary resolution. For example, in one embodiment, one or more rows or nozzles (e.g. rows 61, 62, 63) may be material nozzles and one or more rows of nozzles may be substance nozzles (e.g. row 64). Multiple materials may be employed, for example, having different colour or different physical properties, such as hardness, and blended together upon application to create objects having unified or intermediate properties between the deposited raw materials.

Excess material deposited by the applicator onto the surface 12 can be removed with a shaper, such as a levelling device 32. Levelling device 32 may comprise a cylindrical milling blade which rotates around an axis substantially parallel to the y-axis. The levelling device may rotate at high speed and be located in an extraction enclosure to evacuate removed material. The levelling device may alternatively be a heated cylindrical roller 34 which rotates around an axis substantially parallel to the y-axis. Melted material which adheres to the surface of the heated roller is subsequently removed from it with a scraping blade 35. The purpose of levelling each deposited layer is to ensure that the deposited layer has the prescribed thickness, otherwise subsequent layers may not be deposited in their correct position in the x-direction, resulting in a fabricated object that does not match the desired shape and/or tolerances. The levelling device 32 may be mounted on a translation stage which is capable of movement.

The material is typically shot from the applicator in liquid form and later becomes solid. Applied materials are typically either thermal phase-change materials such as thermoplastics and waxes, or photopolymer resins that can be hardened by exposure to suitable electromagnetic radiation such as ultraviolet light. When a photopolymer material is used a light source 42 can be controlled to emit actinic light 44, such as an ultraviolet or blue light, to harden the applied material. Where the deposited material is a wax or thermoplastic it will harden by freezing provided that the ambient temperature is lower than the softening-temperature of the wax. This process may be enhanced with a cooling fan directing air at the cylinder. Not all embodiments eject material in a purely liquid form. In an embodiment, the material ejected from the applicator may contain suspended solids, such as a colloid, for example. In some embodiments, the material is provided to the applicator by a material feeder such as 301 shown in FIG. 5.

The applicator 16 (or one or more additional applicators in some other embodiments) may also deposit a substance 36 as well as the material 18. The applicator 16 has one or more nozzles 38 for ejecting the substance over the surface. The substance may be stored in a liquid phase in a corresponding substance reservoir in communication with the applicator. In this, but not necessarily all embodiments, the reservoir 40 is integral with the applicator. In other embodiments the reservoir is separate from the applicator and may be connected by a conduit such as a hose in which the substance flows, or it may be drip fed into the applicator. In the illustrated embodiment the substance nozzle is located below the material nozzle but in other embodiments, for example, they may be located in the same horizontal plane or alternatively above. The function of the substance is to provide support for the material forming the object during fabrication so that features that could not otherwise be fabricated, for example overhangs, can be fabricated. The substance may be described as a support substance. The substance and the material in one embodiment are waxes. The substance may have a lower melting point than the material and thus elevating the temperature of the deposited material and substance intermediate their melting points results in the substance melting, leaving the object intact. Alternatively, the waxes may have, for example, different solubility in a solvent such as ethanol, which can be exploited to separate the substance from the material.

Figure 4:
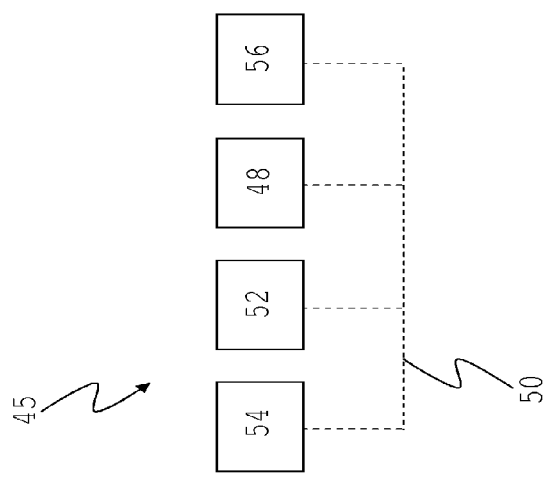
FIG. 4 shows an embodiment of a controller that may be used with the device of FIG. 1.

The applicator 16, translation units 24,26,28, levelling device 32, and light source 42, for example, may be in communication with and may be controlled by a controller 45 to coordinate the material and substance application process. FIG. 4 shows an embodiment of a controller 45 (incorporating a processor unit) of the device 10 shown in FIG. 1. The controller 45 may include a suitable micro processor 48 such as, or similar to, the INTEL PENTIUM, connected over a bus 50 to a memory 52 including random access memory of around 100 Mb and a non-volatile memory such as a hard disk drive or solid state non-volatile memory having a capacity of around 1 Gb. The processor has input/output interfaces 54 such as a universal serial bus and a possible human machine interface 56 e.g. mouse, keyboard, display etc. The applicator, translation units, light source, and possibly other components may be controlled using commercially available machine-to-machine interfaces such as LABVIEW software together with associated hardware recommended by the commercial interface provider installed on the processor unit 48, over USB or RS-232 or TCP/IP links, for example. Alternatively, custom driver software may be written for improved performance together with custom printed circuit boards.

In this embodiment, the controller 45 is in communication with an external processor (not shown) which is adapted for determining instructions and/or information for the device 10. In alternative embodiments, the processors are the same processor. An example of a suitable processing unit comprises a micro processor such as, or similar to, the INTEL PENTIUM, connected over a bus to a random access memory of around 100 Mb and a non-volatile memory such as a hard disk drive or solid state non-volatile memory having a capacity of around 1 Gb. Generally, the configuration may be similar or identical to that shown in FIG. 4. The processor has a receiver such as a USB port (or Internet connection, for example) for receiving information representing an object, stored on a USB FLASH device, for example. The information may be encoded in a file generated by a Computer Aided Design (CAD) program, the information specifying the geometry of the object. The processor runs a decomposer program implementing an algorithm that decomposes (or transforms) the information into data indicative of a plurality of layers of material to be applied sequentially by the device 10, the material being used to make the object. The program may have been installed onto the processor from tangible media such as a DVD or USB memory stick, for example, that stored the program. In an alternative embodiment, the decomposer may be a dedicated hardware unit. A series of sections through the object are determined, each section corresponding to a layer to be applied. The sections are then further processed to represent the geometry of each section as a rasterized bitmap. Regions of the bitmap which represent the object are identified, and further regions of the bitmap which represent a supporting structure for overhanging features of the object are calculated and identified. Furthermore, if the object is to be fabricated from multiple materials or colours, the bitmap representation of the object is further processed to identify which materials need to be present at each location.

The one or more bit maps are then used to control the application of the material and/or substance by the applicator 16.

In an embodiment, the applicator applies material onto the surface. It may be possible to deposit material across the entire surface. Each translation unit may have an associated encoder. An encoder, either a rotational encoder coupled to the motor which drives any one of the translation units or a linear encoder mounted directly on the translation unit, provides feedback of the position of the platform to the processor 45. This information is used to ensure that the applicator deposits material droplets at the correct location on the platform. The applicator may be translated along the y-axis by one droplet width or less by the respective translation unit. This process repeats until the applicator has traversed the full pitch between the nozzles along the y-axis. In this manner a representation of the rasterized cross-section of the object is deposited onto the surface in the required material at a resolution that may exceed the native resolution of nozzle spacing on the applicator. After the layer has been deposited, the translation unit 28 moves the applicator to its original position. The applicator may deposit material during movement. It is understood that due to the periodic spacing of nozzles of some applicators, the starting position of the applicator may be varied by a multiple of the pitch spacing between nozzles in some situations. This may average-out the effects of variation in droplet size deposited by different nozzles.

After a levelling of the solidified material has been completed respective translation unit may retract the levelling device 32 so that it is no longer in contact with the deposited layer.

After the deposited layer has been levelled, if the deposited material is a photopolymer it may be cured by switching on light source 42.

Subsequent layers of the object can be data processed, deposited by the applicator onto the previously deposited layer on the surface 12, hardened and levelled using the process just described. Depositing all layers of the object in this way results in a multilaminate structure in which the material is encased in substance 60.

Another advantage of some embodiments is that a horizontal projecting (shooting or firing) applicator, such as the applicator 16, may be used, as opposed to a downward projecting applicator employed in the prior art. FIG. 5 shows an embodiment of a horizontal projecting applicator configuration 300 that may be adopted by applicator 16, showing a feed source 301 which drips material 302 into a feed reservoir 303 that is connected to a chamber 304 that subsequently feeds material to at least one nozzle 305. The feed rate of material is controlled by an electronic control loop so that the height of fluid in the feed reservoir is lower than the ejector nozzles. This control loop is aided by fluid level sensor 306. This creates a negative head of pressure at the nozzles due to the siphon effect, thereby preventing material from leaking out of the nozzles and maintaining the appropriate fluid meniscus required for the proper operation of the applicator. This horizontal projecting configuration has the advantage of stability—it does not require active control when in a passive state (that is, not operating). It fails safe on power failures, and does not require any special precautions when powering down to prevent leakage. It will be understood that such an applicator may be slightly tilted upwards or downwards, say by 15 degrees.

Figure 6:
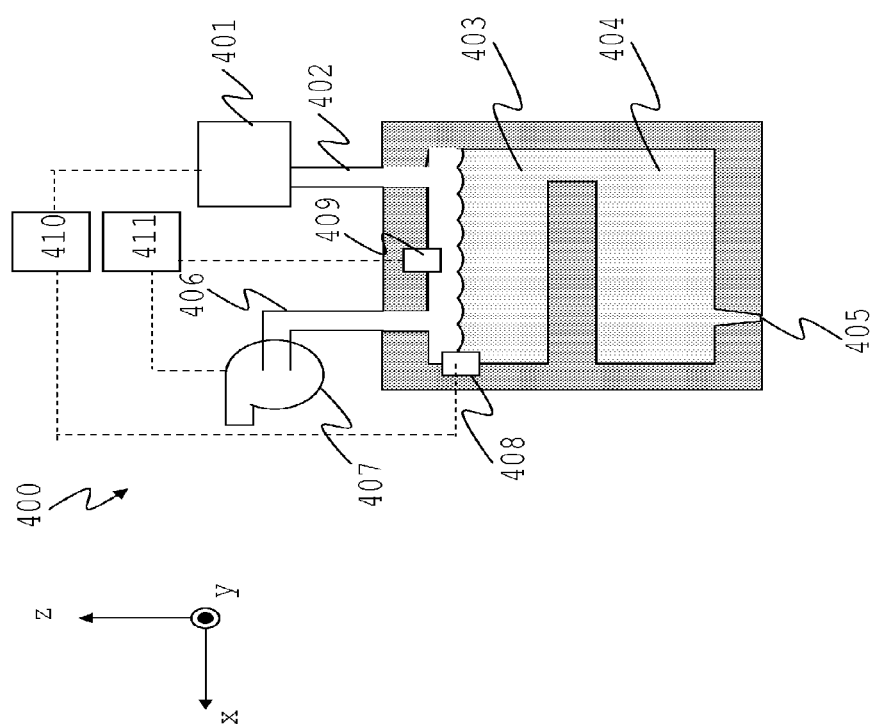
FIG. 6 shows a downward projecting (shooting) applicator assembly of the prior art.

By comparison, FIG. 6 depicts a prior art downward shooting applicator assembly 400, showing a feed source 401 with an air-tight connection 402 to a feed reservoir 403 connected to a chamber 404 that feeds material to nozzles 405. In order to prevent material leaking from the nozzles due to the hydrostatic pressure of the fluid above it, a vacuum is drawn at a port 406 by a vacuum pump 407 to reduce the pressure at the nozzle 405 to below atmospheric pressure. Material level sensor 408 provides feedback to a processing unit 410 in communication with the feed source 401 to ensure a constant fluid level is maintained in the reservoir 403. Pressure sensor 409 provides a feedback signal to a controller 410 in communication with the vacuum pump 407 to control the vacuum in the feed reservoir at the required pressure. It can be seen that this downward shooting applicator apparatus requires air-tight sealing of its feed and evacuation ports, an air-lock system for the addition of further material to the feed source, and active control of fluid level and chamber pressure, adding to the complexity of the device. Furthermore, a momentary loss of vacuum in a downward facing applicator may result in material leakage from the applicator onto the object under fabrication, which can ruin the object. The inherent instability under vacuum failure or power-down impacts the reliability of the system for fabricating objects.

It may be possible to construct a passive negative pressure maintaining system for a downward shooting applicator configuration whereby a fluid reservoir is maintained below the level of the ejection nozzles. In this case the reservoir would need to be located some distance away from the build-envelope to avoid conflict with objects under fabrication, and connected to the applicator via an umbilical tube. Umbilical feed lines may present reliability issues, particularly in the delivery of molten materials.

Thus, for fabricating objects it is advantageous to be able to employ a nominally horizontal projecting (shooting) applicator configuration over a downward shooting applicator as the hardware may be simpler, more robust and inherently failsafe. Thus there may be significant practical advantages to some embodiments which are capable of employing a horizontal projecting (shooting) applicator rather than a downward shooting applicator.

It should be noted however, that an embodiment of the device does apply material downwardly and many advantages are still retained.

FIG. 7 shows and embodiment 70 of the invention whereby the applicator is oriented to project (shoot) material upwardly, that is, against the force of gravity. In this figure items similar to those depicted in FIG. 1 are similarly numbered. This embodiment still may retain the advantage that material may not leak from the applicator onto the object being fabricated.

Now that embodiments have been described it will be appreciated that some embodiments may have some of the following advantageous:

Any material that leaks from the applicator will fall free of the surface and object being made without degrading the quality of the final object.

Nominally horizontal projecting (shooting) applicators may be used which are less likely to leak, fail safe and are simpler than prior art downward shooting applicators.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A device for making an object comprising:
   a substantially vertical flat surface;
   an applicator operable to project at an elevation angle without a substantial downward component a material used to make the object towards the substantially vertical flat surface; and
   a controller adapted to receive instructions for making the object and is configured to coordinate relative movement of the applicator and the surface, and the application of the material by the applicator, such that the material is applied over at least one portion of the surface as a plurality of individually determined layers;
   whereby in use the object is made adjacent to the surface.

2. A device defined by claim 1 wherein the elevation angle is between negative ten degrees (−10°) and positive ninety degree (+90°), the elevation angle being a vertical angle above the horizon.

3. A device defined by claim 1 further adapted to apply a substance adapted to support the material.

4. A device defined by claim 1 comprising a shaper arranged to shape the applied material.

5. A device defined by claim 1 wherein the applicator is capable of projecting a single drop of material when instructed to do so.

6. A device defined by claim 1 comprises a light source illuminating at least some of the surface, the light having characteristics suitable for the curing of a photo-curable fluid.

7. A device defined by claim 1 wherein the applicator is not coupled to a translation unit for substantially vertical movement of the applicator.

8. A device defined by claim 1 wherein the applicator is configured to project the material substantially horizontally.

9. A device defined by claim 1 wherein the applicator has two material reservoirs and a passageway for the communication of material from one of the reservoirs to the other.

10. A device defined by claim 9 wherein one of the reservoirs has an associated nozzle from which material can be projected, and the applicator is configured so that the height of the material in the other reservoir is lower than the nozzle.

11. A device defined by claim 10 wherein the applicator has a controller to control the material level in the other reservoir such that it is lower than the nozzle.

12. A device defined by claim 10 wherein the applicator has a sensor for sensing the material level in the other reservoir.

13. A device defined by claim 9 wherein the reservoirs may be configured such that the fluid pressure at the nozzle is less than atmospheric pressure.

14. A device defined by claim 1 wherein the applicator is coupled to a first translation unit for movement in a first direction.

15. A device defined by claim 14 wherein the first direction is substantially horizontal.

16. A device defined by claim 1 wherein the device is configured to translate the surface in the plane of the surface.

17. A device defined by claim 1 wherein the surface is coupled to at least one translation unit for movement in second and third directions.

18. A device defined by claim 17 wherein the second and third directions are orthogonal to the first direction.

19. A device defined by claim 18 wherein one of the second and third directions is vertical and the other is horizontal.

20. A method of making an object, the method comprising the steps of:
    receiving information indicative of the object; and
    controlling a device according to claim 1 using the information so received to make the object.

* * * * *